United States Patent [19]
Weiss

[11] 4,424,982
[45] Jan. 10, 1984

[54] ATTACHMENT DEVICE FOR A MOTOR VEHICLE

[75] Inventor: Heinz Weiss, Bensheim, Fed. Rep. of Germany

[73] Assignee: Deere & Company, Moline, Ill.

[21] Appl. No.: 354,272

[22] Filed: Mar. 3, 1982

[30] Foreign Application Priority Data

Feb. 26, 1981 [DE] Fed. Rep. of Germany ....... 3107228

[51] Int. Cl.$^3$ ........................................... A01B 59/043
[52] U.S. Cl. ............................... 280/461 A; 172/439; 180/53 C
[58] Field of Search .......... 280/490 A, 490 R, 461 A, 280/460 A, 456 A, 415 R, 415 A; 180/53 C, 53 D, 900; 172/439, 443, 448

[56] References Cited

U.S. PATENT DOCUMENTS

| | | | |
|---|---|---|---|
| 4,000,911 | 1/1977 | Weber | 280/490 R |
| 4,181,181 | 1/1980 | Old | 172/443 |

FOREIGN PATENT DOCUMENTS

| | | |
|---|---|---|
| 1059297 | 6/1959 | Fed. Rep. of Germany . |
| 1065281 | 9/1959 | Fed. Rep. of Germany . |
| 1254979 | 11/1967 | Fed. Rep. of Germany . |
| 1813930 | 7/1970 | Fed. Rep. of Germany . |
| 1655950 | 9/1971 | Fed. Rep. of Germany . |
| 2804129 | 11/1977 | Fed. Rep. of Germany . |
| 2900866 | 7/1980 | Fed. Rep. of Germany . |
| 2852773 | 12/1980 | Fed. Rep. of Germany . |

OTHER PUBLICATIONS

Accord Landmaschinen Publication, H. Weiste & Co. GmbH-Weiste Triangle.

*Primary Examiner*—John A. Pekar

[57] ABSTRACT

An attaching device is described for facilitating the attachment of various implements to the chassis of a motor vehicle. The attaching device includes a first frame having a pair of generally L-shaped support members with vertical and horizontal legs. The vertical legs are connected together at an upper end by a cross bracket and are tiltable relative to the chassis of the vehicle by a hydraulic cylinder connected between the chassis and the cross bracket. The horizontal legs are pivotally attached at one end to a lower point of the chassis and permit the first frame to pivot thereabout. A second frame is movably supported by the vertical legs of the first frame and contains a plurality of coupling elements arranged in the preset relationship for easy coupling to an attachable implement. The second frame is movable relative to the first frame by hydraulic drive cylinders which provide up and down movement of the second frame in a stepless manner. The variety of coupling elements which are contained in the second frame along with the ability of the second frame to move relative to the first frame and for the first frame to tilt relative to the chassis produces a universal attachment device which can accommodate most implements.

19 Claims, 3 Drawing Figures form of a joystick, it is possible to vary the angular position of the first frame 12 relative to the chassis 20 of the vehicle. When the first frame 12 is in a lowered position, the vehicle can be moved such that the attaching brackets 25 can engage an implement which is to be lifted, moved or pulled across the ground.

4,424,982

ATTACHMENT DEVICE FOR A MOTOR VEHICLE

FIELD OF THE INVENTION

This invention relates to an attachment device for facilitating the attachment of various implements to the chassis of a motor vehicle and more particularly to an attachment device for attaching implements to agricultural or industrial tractors.

BACKGROUND OF THE INVENTION

For many agricultural and industrial vehicles it is necessary that various implements be attached to the front or rear in order to faciltate the tilling, plowing, excavating or moving of soil or crops. One problem which currently exists is that it is sometimes difficult to attach various implements to the standard hitch on such vehicles. One reason for this is that different implements have connecting members at different heights relative to the ground and therefore it is necessary for the operator to manually adjust a coupling member on the tractor to correspond to that height. In addition, many inplements require hydraulic hook-ups in order to facilitate activation of hydraulic cylinders contained thereon and this sometimes requires the operator to climb onto the tractor chassis in order to get close to the coupler members in order to connect the hydraulic hoses. Such action could result in injury to the operator should he slip and fall from the tractor to the ground.

Various proposals to correct the above problems have resulted in the use of an attachment device which is attached either to the front or rear of the vehicle and to which the implement is then fastened. Many different forms of such attachment devices are available in the art but most tend to lack the universal features needed to enable an operator to attach various types of implements to his vehicle. Now, an attachment device has been invented which facilitates the attachment of various implements to the chassis of a motor vehicle.

SUMMARY OF THE INVENTION

Briefly, this invention relates to an attachment device for facilitating the attachment of various implements to the chassis of a motor vehicle, especially the attachment of implements to an agricultural or industrial tractor. The attachment device includes a first frame having a pair of generally L-shaped support members with vertical and horizontal legs. The vertical legs are connected together at an upper end by a cross bracket while the horizontal legs are pivotally attached at one end to the motor vehicle chassis. The first frame can support a three-point hitch having a top bar pivotally attached to the cross bracket and a pair of lower bars attached to each of the horizontal legs. A second frame is movably supported by the vertical legs of the first frame and contains a plurality of coupling elements arranged in a preset relationship. The second frame is movable in a stepless manner along the vertical legs of the first frame by hydraulic cylinders which enable the second frame to be elevated relative to the ground. A pair of connecting rods are also attached between the second frame and the lower bars of the first frame to enable the lower bars to move relative to the top bar of the three-point hitch and facilitate easy hook-up of an attachable implement. The attachment device also includes a hydraulic cylinder connected between the vehicle chassis and the cross bracket of the first frame to allow the first frame to be tilted relative to the chassis. In addition, the attachment device includes a mechanical locking means for locking the second frame to the first frame at predetermined heights along the vertical legs of the first frame such that an implement can be secured in a given position.

The general object of this invention is to provide an attachment device for facilitating the attachment of various implements to the chassis of a motor vehicle. A more specific object of this invention is to provide an attachment device for facilitating the attachment of various implements to the chassis of an agricultural or industrial tractor.

Another object of this invention is to provide an attachment device for facilitating the attachments of various implements to a vehicle which can be tilted and locked in a set position.

Still another object of this invention is to provide an attachment device for facilitating the coupling of an implement to a motor vehicle which can be affected rapidly and reliably by a single operator.

A further object of this invention is to provide an attachment device for facilitating the attachment of implements to a motor vehicle when the implement to be attached is in a particular elevated position without the danger of the implement descending unexpectedly under the influence of gravity.

Still further, an object of this invention is to provide a universal attachment device which can be fitted to the front or rear of an agricultural or industrial tractor and which can be coupled to a wide variety of implements.

Other objects and advantages of the present invention will become more apparent to those skilled in the art in view of the following description and the drawings.

DETAILED DESCRIPTION OF THE PREFERRED EMBODIMENT

Figure 1:
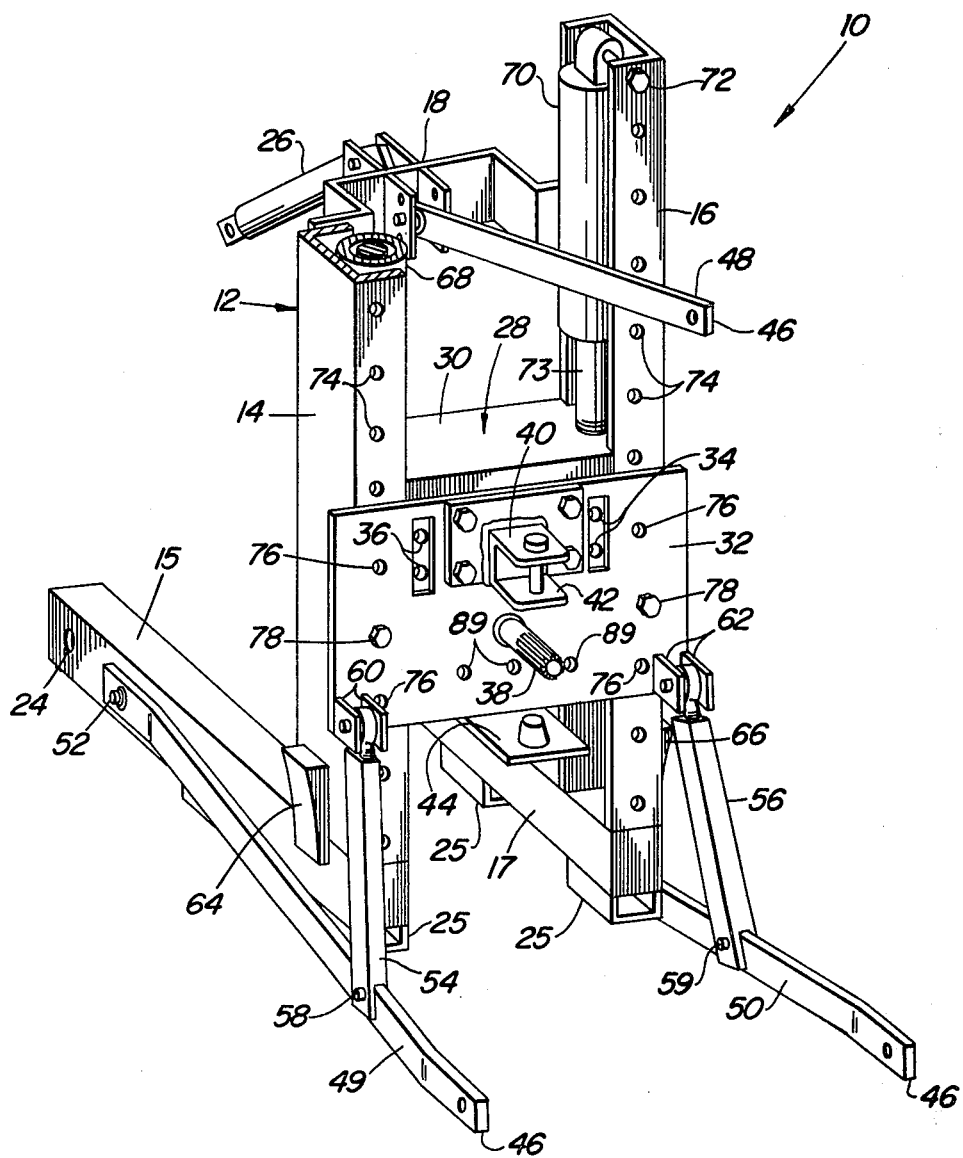
FIG. 1 is a perspective view of the attachment device of this invention including a three-point hitch hookup.
Figure 2:
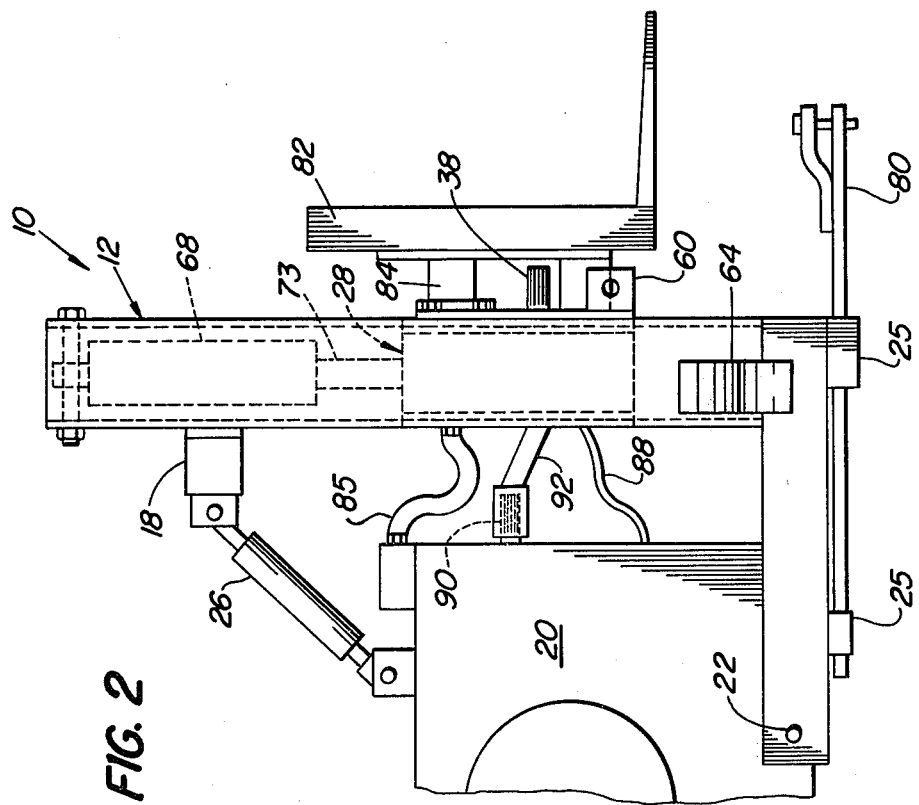
FIG. 2 is a side view of the attachment device shown in FIG. 1 having a fork lift and draw bars attached thereto in place of the three-point hitch.

Referring to FIGS. 1 and 2, an attachment device 10 is shown having a first frame 12 constructed of a pair of generally L-shaped support members. Each of the generally L-shaped support members contains vertical and horizontal legs 14 and 15 and 16 and 17, respectively. The vertical legs 14 and 16 are constructed in the form of a U with the open ends of the U's facing each other. The vertical legs 14 and 16 are also connected together approximate an upper end by a cross bracket 18. The horizontal legs 15 and 17 are of a hollow bar construction and each is designed to be pivotally connected to opposite sides of a motor vehicle chassis 20 by a pin 22, see FIG. 2. The pins 22 pass through a circular opening 24 formed in one end of each of the horizontal legs 15 and 17. The horizontal legs 15 and 17 also contain attaching brackets 25 fixed to their lower surfaces, the purpose of which will be explained shortly when referring to FIG. 2.

The first frame 12 is tiltable relative to the chassis 20 by means of a hydraulic cylinder 26 which is connected between the cross bracket 18 and the chassis 20. By extending or retracting the hydraulic cylinder 26 via control levers, not shown, which can be located in the operator's station of the vehicle, the operator can pivot the first frame 12 about the pair of pins 22 thereby elevating or lowering as well as angling the first frame 12 relative to the ground.

Movably supported in the two U-shaped vertical legs 14 and 16 of the first frame 12 is a second frame 28. The second frame 28 is constructed of two parts, namely a cross member 30 which is slidably guided in the vertical legs 14 and 16 and a face plate 32 which is rigidly connected to the cross member 30. The face plate 32 is movable in front of the U-shaped vertical legs 14 and 16 and extends laterally outside of them. The second frame 28 includes a plurality of coupling elements that are necessary for the suspension or attachment of a working implement as well as for the driving of the latter. These coupling elements are grouped together and mounted on the second frame 28 in a predetermined arrangement such as to provide a universal attaching mechanism which will fit most implements. In this connection, the second frame 28 includes at least two hydraulic coupling elements 34, at least one and preferably two electrical coupling elements 36, an implement driving stud shaft 38, a trailer coupler 40 with a draw bar receiving mouth 42, and a single point coupling member 44. It should be noted that the implement driving stud shaft 38 is located in a position which is particularly suitable for use in connection with a three-point hitch coupler 46 attached to the first frame 12. Any combination of the coupling elements can be used or interchanged as desired. The three-point hitch coupler 46 includes a top bar 48 pivotally connected at one end to the cross bracket 18 and a pair of lower bars 49 and 50 which are swivelably attached by pins 52 to each of the horizontal legs 15 and 17, respectively. The lower bars 49 and 50 are directly connected to the second frame 28 by connecting rods 54 and 56. The connecting rods 54 and 56 are pinned to the lower bars 49 and 50 by pins 58 and 59, respectively, and are attached to the second frame 28 by brackets 60 and 62 in a swivel fashion such that the lower bars 49 and 50 can swing outward or inward to a limited extent relative to the generally L-shaped structural members. Although the three-point coupler 46, as illustrated, does not have the top bar 48 mounted to the second frame 28, this is a possibility which could be utilized.

Sway blocks 64 and 66 are also mounted to the first frame 12 on the outer surfaces of the vertical legs 14 and 16 to control the lateral movement of the lower bars 49 and 50. As shown in FIG. 1, upward movement of an implement above a given raised position is restricted or prevented by stressing of the lower bars 49 and 50 as they are moved laterally outward by the sway block 64 and 66.

The second frame 28 is slidable in a stepless manner within the U-shaped vertical legs 14 and 16 of the first frame 12 by two hydraulic cylinders 68 and 70. The hydraulic cylinders 68 and 70 can be fastened to the vertical legs 14 and 16 by bolts 72 and in turn be threadily attached into the second frame 28. When assembled in this fashion, the extension of each cylinder rod 73 would lower the second frame 28 relative to the ground while retraction of the cylinder rods 73 would raise the second frame 28 relative to the ground. It is also feasible to fluidly connect the hydraulic cylinders 68 and 70 together such that fluid leaving the top end of the cylinder 68 can be routed into the bottom end of the cylinder 70 to ensure unison of operation. This particular fluid connection and variations thereof should be evident to those skilled in the art and therefore has not been shown in the drawings.

The vertical legs 14 and 16 of the first frame 12 also contain a plurality of holes 74 which can be aligned with holes 76 formed on opposite sides of the face plate 32. By inserting one or more bolts 78 through aligned holes, the second frame 28 can be mechanically locked to the vertical legs 14 and 16. The mechanical locking feature permits an operator to physically lock the second frame 28 at a given height relative to the first frame 12 without the danger of having the second frame 28 unexpectedly descend under the influence of gravity.

Referring now to FIG. 2, the attachment device 10 is shown without the three-point coupler 46 but instead with draw bars 80 and a fork lift 82. The draw bars 80 are attached to the horizontal legs 15 and 17 by the brackets 25 while the fork lift 82 is attached to the second frame 28 via a triangular support 84. It should be noted that the draw bars 80 will also have to be pinned or otherwise secured to the first frame 12 to prevent then from being pulled out during use. Normally, the use of only one draw bar 80 is sufficient. Also, the draw bars 80 and the fork lift 82 can be used either separately or together.

FIG. 2 also shows one of a pair of hydraulic hoses 86 attached between the chassis 20 and the second frame 28 which serves to provide fluid to one of and from a reservoir to the pair of hydraulic coupling elements 34. An electrical conduit 88 is also present for connecting a power unit on the motor vehicle to the electrical coupling elements 36. The mechanical connection between the motor vehicle chassis 20 and the second frame 28 includes a gear shaft 90 and an intermediate shaft 92 splined to the stud shaft 38. More preferably, the intermediate shaft 92 can be a cardan shaft which incorporates connections at each end which compensate for variations in the distance between the gear shaft 90 and the stud shaft 38.

Figure 3:
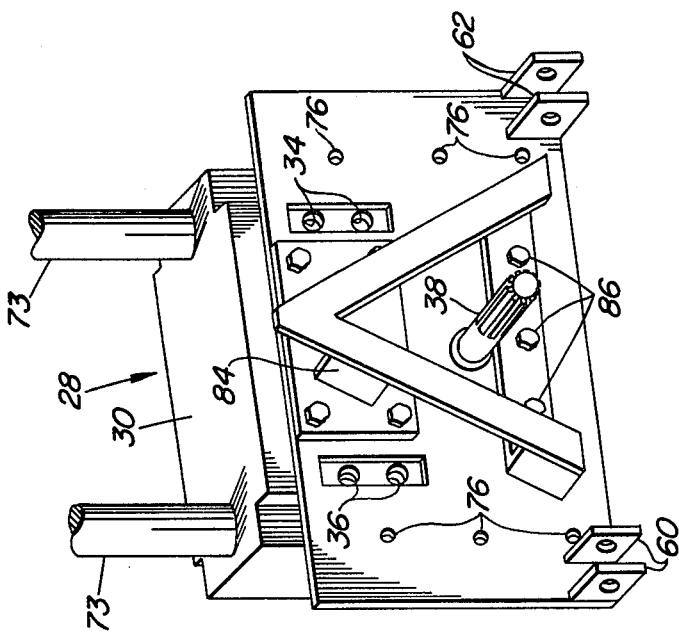
FIG. 3 is an enlarged view of the second frame containing a quick-action coupling element.

Turning now to FIG. 3, an enlarged view of the second frame member 28 is shown having the triangular support 84 mounted by bolts 86 into threaded holes 89 formed in the face plate 32. The triangular support 84 can be a Weiste triangle which are in common use in Europe for attaching small size implements to a tractor. The Weiste triangle is a support member manufactured by H. Weiste & Co. Gmbh, who's address is: Coesterweg 42, Postfach 706, 4770 Soest.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An attachment device for facilitating the attachment of various implements to the chassis of a motor vehicle, said attachment device comprising:
  (a) a first frame having a pair of generally L-shaped support members with vertical and horizontal legs, said vertical legs being connected together approximate an upper end by a cross bracket and said horizontal legs being pivotably attached at one end to said motor vehicle chassis, said first frame containing a three-point hitch having a top bar pivotably attached to said cross bracket and a pair of lower bars attached to each of said horizontal legs;

(b) means for tilting said first frame relative to said motor vehicle chassis, said means positioned between said chassis and said cross bracket;

(c) a second frame movably supported by said vertical legs of said first frame and containing a plurality of coupling elements arranged in a preset relationship for easy coupling to an attachable implement;

(d) drive means mounted on said first frame and connected to said second frame for moving said second frame in a stepless manner along said vertical legs of said first frame;

(e) a pair of rods connected between said second frame and each of said lower bars of said three-point hitch, said rods enabling said lower bars to be moved relative to said top bar to facilitate easy hook-up of said three-point hitch; and (f) mechanical means for locking said second frame to said first frame at predetermined heights along said vertical legs of said first frame.

2. The attachment device of claim 1 wherein sway blocks are fixed to an outward side of each of said support members to limit lateral mobility of said lower bars.

3. The attachment device of claim 2 wherein said sway blocks are of a shape which determines the lateral movement of said lower bars.

4. The attachment device of claim 1 wherein said drive means for tilting said first frame relative to said motor vehicle chassis is a hydraulic cylinder.

5. The attachment device of claim 1 wherein said drive means are a pair of hydraulic cylinders.

6. The attachment device of claim 1 wherein said second frame is mechanically and hydraulically connected to said motor vehicle.

7. The attachment device of claim 6 wherein said mechanical connection includes a gear shaft fixed to said motor vehicle chassis, a stud shaft fixed to said second frame and an intermediate shaft joining said gear shaft to said stud shaft.

8. The attachment device of claim 1 wherein said mechanical means for locking said second frame to said first frame includes a plurality of bolt holes formed in rows on said vertical legs and oppositely aligned rows formed in said second frame and at least one bolt insertable through a hole in said second frame when aligned with a hole in one of said vertical legs.

9. The attachment means of claim 1 wherein said second frame is electrically connected to said motor vehicle.

10. An attachment device for facilitating the attachment of various implements to the chassis of a motor vehicle, said attachment device comprising:

(a) a first frame having a pair of generally L-shaped support members with vertical and horizontal legs, said vertical legs being connected together approximate an upper end by a cross bracket and said horizontal legs being pivotably attached at one end to said motor vehicle chassis;

(b) a hydraulic cylinder connected between said chassis and said cross bracket for tilting said first frame relative to said motor vehicle chassis;

(c) a second frame movably supported by said vertical legs of said first frame and containing a plurality of coupling elements, at least one of said coupling elements capable of being positioned on said second frame for facilitating coupling to an attachable implement;

(d) drive cylinders mounted on said first frame and connected to said second frame for moving said second frame in a stepless manner along said vertical legs of said first frame;

(e) attachment brackets formed on a surface of each of said horizontal legs of said first frame for facilitating attachment of a coupling element;

(f) mechanical means for locking said second frame to said first frame at predetermined heights along said vertical legs of said first frame; and (g) a power drive extending from said chassis to said second frame for providing a rotational coupling element on said second frame, said power drive being capable of compensating for variations in distance between said first and second frames to a limited extent.

11. The attachment device of claim 10 wherein said plurality of coupling elements on said second frame includes a revolvable stud shaft, a draw bar receiving mouth, a trailer coupling and hydraulic quick-connecting couplers.

12. The attachment device of claim 10 wherein a triangular support is fixed to said second frame and serves as a mechanical quick-action coupling element.

13. The attachment device of claim 10 wherein said second frame is hydraulically coupled to said motor vehicle.

14. The attachment device of claim 13 wherein said mechanical connection includes a gear shaft fixed to said motor vehicle chassis, a stud shaft fixed to said second frame and an intermediate shaft joining said gear shaft to said stud shaft.

15. The attachment device of claim 10 wherein said second frame is electrically connected to said motor vehicle.

16. An attachment device for facilitating the attachment of various implements to the chassis of a motor vehicle, said attachment device comprising: a first frame pivotally mounted to said chassis and tiltable by a hydraulic cylinder, said first frame disposed substantially vertical when in a normal position relative to said chassis, a second frame elevationally adjustable in a stepless manner along said first frame by hydraulic power means, said second frame carrying a plurality of coupling elements arranged in a preset relationship for easy coupling to an attachable implement, mechanical means for locking said second frame to said first frame at predetermined height levels with respect to said first frame and a power drive extending from said chassis to said second frame for providing a rotational coupling element on said second frame.

17. An attachment device for facilitating the attachment of various implements to the chassis of a motor vehicle, said attachment device comprising:

(a) a first frame having a pair of generally L-shaped support members with vertical and horizontal legs, said vertical legs having a U-shaped configuration with the open ends of the U's facing each other, said vertical legs being connected together approximate an upper end by a cross bracket and said horizontal legs being pivotably attached at one end to said motor vehicle chassis, each of said horizontal legs further having a least one attachment bracket fixed thereto for facilitating attachment of a coupling element;

(b) means for tilting said first frame relative to said motor vehicle chassis, said means positioned between said chassis and said cross bracket;

(c) a second frame movably supported by said vertical legs of said first frame and containing a plurality of coupling elements arranged in a preset relationship for easy coupling to an attachable implement;

(d) drive means for moving said second frame in a stepless manner along said vertical legs of said first frame, said drive means including a pair of hydraulic cylinders each located within one of said vertical legs of said first frame and being attached at opposite ends to said first and second frames, respectively;

(e) mechanical means for locking said second frame to said first frame at predetermined heights along said vertical legs of said first frame; and (f) a power drive extending from said chassis to said second frame for providing a rotational coupling element on said second frame.

18. The attachment device of claim 17 wherein said power drive includes a rotatable drive shaft extending out of said chassis, an implement driving stud shaft extending out of said second frame member and an intermediate shaft splined between said drive shaft and said stud shaft which is capable of transferring rotational motion therebetween and further being capable of compensating for variations in distance between said drive shaft and said stud shaft to a limited extent.

19. The attachment device of claim 18 wherein said intermediate shaft is a cardan shaft.

* * * * *